United States Patent [19]

Dillon

[11] Patent Number: 4,952,445

[45] Date of Patent: Aug. 28, 1990

[54] MARBLE TILE TRIM

[76] Inventor: Rick A. Dillon, 21 Cold Spring Rd., Stamford, Conn. 06905

[21] Appl. No.: 337,662

[22] Filed: Apr. 13, 1989

[51] Int. Cl.[5] ........................ B32B 31/18; B32B 3/30; E04B 1/41; B28D 1/30

[52] U.S. Cl. .................................... 428/156; 428/172; 428/130; 428/167; 428/414; 156/154; 156/250; 52/288; 52/287; 125/1

[58] Field of Search ............... 428/130, 156, 167, 414, 428/172; 156/154, 250; 52/288, 287; 125/1

[56] References Cited

U.S. PATENT DOCUMENTS

| | | | |
|---|---|---|---|
| 1,658,371 | 9/1928 | Degner | 125/1 |
| 3,222,837 | 12/1965 | Daley | 52/288 |
| 3,271,232 | 4/1966 | Moore | 428/156 X |
| 3,950,202 | 4/1976 | Hodges | 156/154 |

FOREIGN PATENT DOCUMENTS

| | | | |
|---|---|---|---|
| 15533 | of 1899 | United Kingdom | 52/288 |

*Primary Examiner*—Ellis P. Robinson
*Assistant Examiner*—William P. Watkins, III
*Attorney, Agent, or Firm*—Roland T. Bryan

[57] ABSTRACT

A strong marble tile trim for providing a smooth transition at an inside corner between two tile walls and at an outside corner for a termination point of tile, is shown in which the tile trim is made from permanently bonded strips with one of the strips having an exposed face formed as a quarter-round surface having a radius in the range of about 2.0 to 3.3 times the thickness of the tile. The method of making the strip is described in which two standard tiles have their major faces placed against permanently bonding mortar and, after being bonded, they are cut into strips and one of said strips has formed thereon, by grinding, either a concave or a convex surface having a radius in the range of about 2.0 to 3.3 times the thickness of the tile for which it has been formed, yet still within one tile thickness.

6 Claims, 2 Drawing Sheets

MARBLE TILE TRIM

BACKGROUND OF THE INVENTION

1. Field of the Invention

This invention relates to marble tile trim and a method of making same in the field of marble tile laying or setting.

Marble tile and similarly cut natural stone are difficult to work with because they have natural graining which is the result of discontinuities in the basic structure of the stone. It is the surface appearance of these discontinuities that gives marble and other stones their characteristic appealing appearance. Yet, these discontinuities are the very point at which fracture of the tile often occurs. The tiles are highly desirable for use in bathrooms, lavatories, and commercial building entryways because of their appearance.

The standard tile is a piece that is about $12'' \times 12'' \times \frac{3}{8}''$ thick which has been cut from a slab by a stone saw. The colors of a batch of tiles tend to be similar because they have been cut from the same stone or from a stone adjacent in the quarry. Thus, the tile setter attempts to have all tiled areas covered by tiles coming from a similarly colored batch of tiles.

Prior to setting tiles for a desired surface effect, a substrait is laid which, in these modern times, is usually a concrete prefabricated board having a thickness of about one-half inch. These concrete boards are placed forming the corners, both outside and inside, in all of the areas where the tile is desired. The tile setter then comes and places the marble tiles on the board using a permanent type of mortar or bonding agent to form a continuous planar wall. To join continuous planar walls, the tile setter requires some type of transition piece which is called "trim." There is the requirement to terminate a planar wall at some position which is short of the end of the wall upon which the tile is placed and at that position, some means is required to dress off the end of the set tile.

In all of these instances, it is desirable to make a gently rounded transition to the adjacent wall. The transition should be in colors and appearance that blends with the wall. Thus, some form of marble would be desired.

2. Description of the Prior Art

Heretofore tile setters have specially ground slabs of marble, which are thicker than the standard tile, with a gently rounded surface so as to form a gentle transition from one wall to the other, but these thicker slabs suffer the disadvantage that they easily break at the discontinuities. As the slabs come from a different piece of stone than that of the tile, they often are not of a pleasingly matching color.

Because of the disadvantage of the specially ground thick slab trim pieces described above tile setters have resorted to less pleasing expediencies of rounding off the edge of the last course of tile or leaving it sharp. They made a sharp joint at the corners by abutting adjacent tiles. These sharp corners are subject to chipping and are not pleasing to the eye.

Although marble tile setting has been known for many centuries, there has been no satisfactory solution to the problems described.

SUMMARY OF THE INVENTION

The invention provides a strong marble tile trim for use with and color matached to a specific batch of standard marble tiles that are being set. The trim comprises two strips of marble, at least one of which has been cut from standard tiles of the batch, with the strips permanently bonded to each other at their major faces. One of the exposed faces of the bonded tile is formed as a quarter-round surface of a radius that is in the range of about 2.0 to 3.3 times the thickness of each standard tile. It has contiguous planar surfaces at opposite sides of the quarter-round surface, each of which lies in a plane that is oriented 90° from the plane of the opposite planar surface, so that the quarter-round surface presents a gently rounded transition from a surface of a standard marble tile in one plane to a standard marble tile in the second plane that is 90° therefrom.

It is further contemplated that the aforesaid invention shall have the quarter rounded surface either concave or convex.

The above-described marble tile trim is made with the quarter rounded surfaces entirely within one of the laminated strips.

The tile trims are made by a method comprising the steps of permanently laminating together, two tiles of a single batch at their major surfaces, and cutting the laminated tiles into strips. The strips are then ground so that a major surface of the laminated strip has formed therein a quarter-round surface having a radius equal to 2.0 to 3.3 times the thickness of the standard tile, and then grinding the long edges of the strip to form a contiguous planar surface to the quarter-round surface.

DESCRIPTION OF THE INVENTION

Like numbers designate like parts of the invention as used hereinafter.

Figure 1:
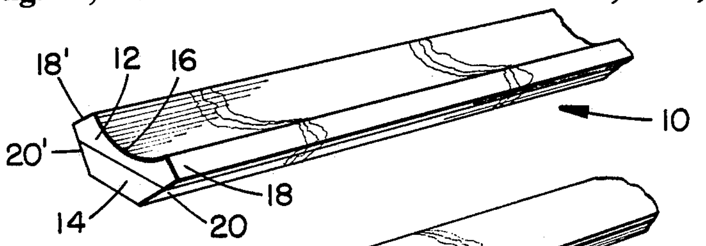
FIG. 1 is a perspective view of an embodiment of the invention with a concave transition surface.
Figure 2:
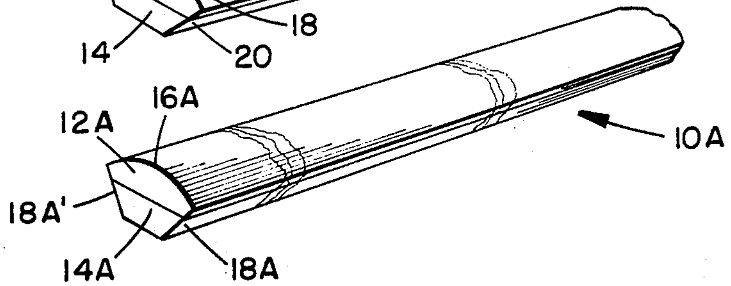
FIG. 2 is a perspective view of an embodiment of the invention with a convex transition surface.

FIGS. 1 and 2 are artist's conceptions and are intended for illustrations only. The following specification is intended to provide the specific description of the invention rather than the general showing in the drawings of FIGS. 1 and 2 which illustrate the tile trim invention in the two forms needed for the trimming of set tiles. The tiles 10, 10A are each made from two strips 12, 12A that are permanently bonded to pieces 14, 14A to form a strong marble tile trim. Each of the two illustrated forms has a major exposed surface having a gently rounded transition 16, 16A, which is confined entirely within one strip 14 14A. Transition surface 16 is concave, and surface 16A is convex.

Each trim is provided with a planar surface contiguous to each of the gently rounded surfaces 16, 16A. These planar surfaces are designated 18, 18' and 18A, 18A'. Each surface lies in a plane that is oriented 90° from the one at the opposite side of the transition surface. These opposite planes match up with the squared ends of the tiles on intersecting walls (not shown), so that the gently rounded surfaces 16, 16A present a gently rounded transition from the tiles in one wall plane to the tiles in another wall plane that is 90° therefrom. The purpose of this is to present a gently pleasing transition from the surface of one wall to the surface of another wall at a corner.

The trim 10 of FIG. 1 is a transition piece for an inside corner, and the trim 10A of FIG. 2 is the transition piece for an outside corner or a wall ending.

The trim of FIG. 1 has surfaces 20, 20′ shaped so that they are at opposite edges from surfaces 18, 18′ in planes that are 90° from each other to allow the trim to fit snugly against the two ends of set tile on a wall which requires a smooth transition to another wall.

The trim is formed by two ⅜-inch thick strips 12, 14 of marble permanently bonded together by a standard marble bonding agent, with the surface 16 forming the smooth transition, for example, between two walls of marble tile that require an inside joint corner. Typically, such walls of tile each have ⅜-inch thick standard tile set onto a substrait of mortar or concrete which, at the end of a course of tile, leaves an exposed edge consisting of the tile, concrete board, and mortar at the corner joint. The surfaces 18, 18′ are dimensioned to butt the exposed edge of the plane of the tiled wall for which the transition is desired. This leaves only the transition surface 16 exposed to view.

The trim 10A of FIG. 2, on the other hand being the transition piece for an outside corner, is specially shaped for covering the exposed ends of the tile course and substraits to which a gentle transition is desired. Accordingly, trim 10A has the gently rounded surface 16A formed wholly on the exposed surface of strip 12A. At its opposite edges, contiguous planar surfaces are formed in a plane that is oriented 90° from the plane of the opposite edge of the gently rounded surface. These surfaces are designated 18A, 18A′. Their function is to cover the exposed ends of the tile, mortar, and the concrete board substrait (not shown), so that there is a gently rounded and nicely appearing marble ending to a marble tile wall that stops short of the wall end, or provides a gently rounded corner where two tile walls intersect.

In both of the trims of FIGS. 1 and 2, the gently rounded transition surface is shown as a quarter round with a radius that is 2.67 times the thickness of the marble tile. Thus, for a standard tile the radius of surfaces 16, 16A is one inch. This is the preferred radius, but the appearance of the marble wall corner joints and wall endings can be satisfactory if the radius is in the range of about 2.0 to 3.3 times the standard thickness of the tile. So, for instance, the illustrated tile trim being made from standard tile has a radius of one inch, and the radius for the range given, utilizing standard tile, would be in the range of about ¾″ to about 1¼Δ.

It is also contemplated by the invention that the gentle transition surface does not have to conform exactly to a surface of a cylinder. Some variation from that ideal geometric form is possible without departing from the spirit of the invention.

The importance of the gently rounded transition surfaces of the present invention is that they provide a curvature and thus a radius that is considerably larger than has heretofore been achieved on individual tiles and, of course, the beauty, appearance, and convenience of the previously described slab, while the present invention is considerably stronger and has better color match.

Figure 3:
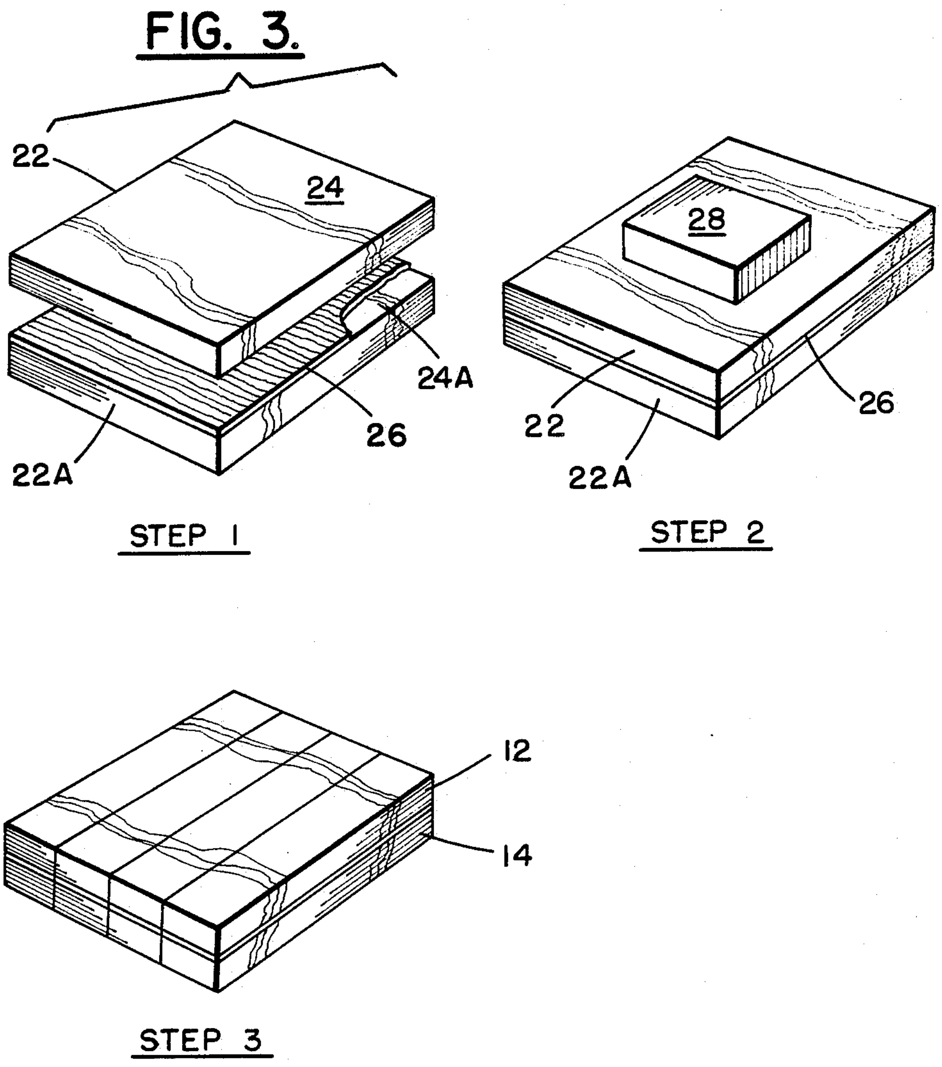
FIG. 3 illustrates the inventive method steps 1, 2, and 3 for making the embodiments for FIGS. 1 and 2.
Figure 4:
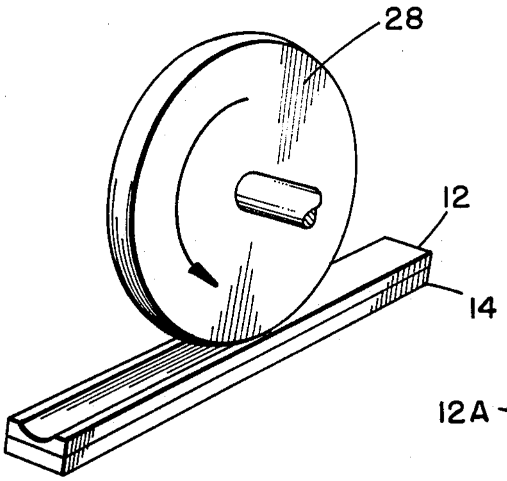
FIG. 4 illustrates step 4 of the process for making the trim of FIG. 1.
Figure 5:
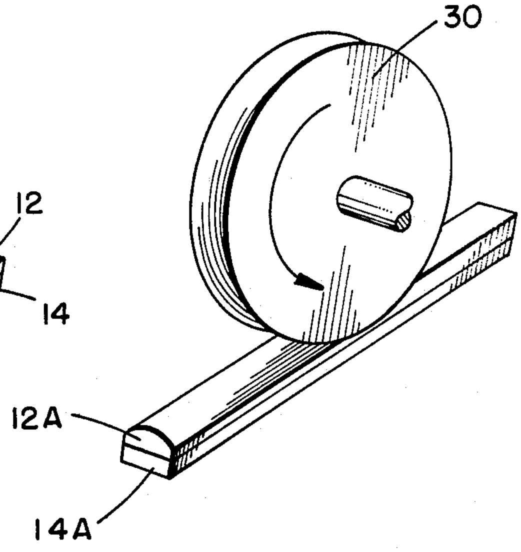
FIG. 5 illustrates step 4 of the process for making the trim of FIG. 2.

The trim of the invention shown in FIGS. 1 and 2 is made by a manufacturing process illustrated in steps 1, 2, and 3 of FIG. 3 and further shaped by the process shown in FIGS. 4 and 5.

In step 1, there are two standard marble tiles that are 12″×12″ and one of which comes from a single batch of tile which has a generally uniform pattern of color and discontinuities. Thus, ties 22, 22A, each have, for example, weakening discontinuities 24, 24A, are arranged so that their broad sides fate against each other with a bonding material 26 laid between them.

In step 2, a weight 28 is put upon tile 22 to hold it in firm engagement with the bonding material 26 that is in contact with the face of tile 22A. Other means, such as presses or vices, may be used to provide the necessary pressure to hold the tiles 22 22A while the bonding agent is setting. The marble bonding agent that is preferred is the standard epoxy adhesive that is specified in American National Standard Institute (ANSI) specifications, A108.6 and A118.3, but it is satisfactory to use any if the permanent mortars that are specified for marble in the *Handbook for Ceramic Tile Installation,* of the Tile Council of America, P. O. Box 326, Princeton, N.J. 08542.

After the bond of step 2 is complete and permanent, the laminated tiles are cut into strips about 2 inches wide (for clarity sake, only four cuts are shown in FIG. 3). These strips are then ground to provide the transition surfaces, as shown in FIGS. 4 and 5, to form the trim that was described and illustrated in FIGS. 1 and 2. It is important that only one stripmust come from the tiles of a batch for color matching purposes.

FIG. 4 illustrates the grinding using a grinder 28 to make the concave transition surface 16 of FIG. 1, and FIG. 5 illustrates the grinding using a grinder 30 to form the convex surface 16A. Following the surface grinding, the strip is then cut to form the other planar surfaces that are shown and described with respect to FIGS. 1 and 2.

While there has been illustrated and described a specific form of the invention that is now known, those skilled in the art will understand that changes may be made in the form of the article and method disclosed without departing from the spirit of the invention covered by the claims and that some features of the invention may be sometimes used to advantage without a corresponding use of the other features.

I claim:

1. A strong marble tile trim for use with and color matched to a specific batch of standard marble tiles comprising two strips of marble, at least one of which is cut from tile of said batch, permanently bonded to each other at their major faces and said one strip having one exposed face formed as a quarter-round surface of a radius that is in the range of about 2.0 to 3.3 times the thickness of each standard tile with contiguous planar surfaces at opposite sides of said quarter-round surface and each planar surface lying in a plane that is oriented 90° from the plane of the other planar surface, so that the quarter-round surface is wholly within said one strip and presents a gently rounded transition from a surface of standard marble tile in one plane to a standard marble tile in a second plane surface 90° therefrom.

2. The marble tile trim of claim 1 in which the quarter-round surface is concave.

3. The marble tile trim of claim 1 in which the quarter-round surface is convex.

4. A tile according to any prior claim in which the two strips are bonded so that any weakness point of one strip is not contiguous to a weakness point of the other strip.

5. A method of making trim for marble tile comprising the steps of (a) taking two standard tiles with at least one from a batch of tiles having similar coloring, (b) permanently laminating them together at their major surfaces using standard marble tile bonding agents, (c) cutting them into a multiplicity of strips, each having major planar surfaces, (d) grinding a major surface of the one of laminated strips that is from a batch of tiles having similar coloring to form, wholly within said strip a quarter-round surface at a radius equal to about 2.0 to 3.3 times the thickness of the standard tile, and (e) grinding said laminated strip to form a contiguous planar surface to said quarter-round surface.

6. A method according to claim 5 in which, prior to lamination, one of said tiles is turned end for end so that when laminated any weakness in the one tile does not align with the similar weakness of the second tile.

* * * * *